(12) United States Patent
Liu et al.

(10) Patent No.: US 10,983,925 B2
(45) Date of Patent: Apr. 20, 2021

(54) CONFIGURATION PROFILE UPDATES

(71) Applicant: HEWLETT-PACKARD DEVELOPMENT COMPANY, L.P., Spring, TX (US)

(72) Inventors: Weize Liu, Spring, TX (US); Ming-Chang Hung, Taipei (TW); Nung-Kai Chen, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/641,940

(22) PCT Filed: Dec. 12, 2017

(86) PCT No.: PCT/US2017/065774
§ 371 (c)(1),
(2) Date: Feb. 25, 2020

(87) PCT Pub. No.: WO2019/117863
PCT Pub. Date: Jun. 20, 2019

(65) Prior Publication Data
US 2020/0226076 A1 Jul. 16, 2020

(51) Int. Cl.
*G06F 13/10* (2006.01)
*G06F 16/23* (2019.01)

(52) U.S. Cl.
CPC ........ *G06F 13/102* (2013.01); *G06F 16/2379* (2019.01)

(58) Field of Classification Search
CPC ........................... G06F 13/102; G06F 16/2379
See application file for complete search history.

(56) References Cited

U.S. PATENT DOCUMENTS

| 7,502,803 | B2 | 3/2009 | Culter et al. | |
| 7,730,295 | B1* | 6/2010 | Lee | G06F 9/4401 713/1 |
| 9,612,846 | B2 | 4/2017 | Puthillathe | |
| 2005/0038986 | A1* | 2/2005 | Agan | G06F 9/4411 713/2 |
| 2010/0211717 | A1* | 8/2010 | Uehara | G06F 9/4411 710/316 |
| 2011/0225274 | A1 | 9/2011 | Dvorkin | |
| 2013/0080754 | A1* | 3/2013 | Ganesh | G06F 9/4403 713/2 |
| 2014/0068585 | A1* | 3/2014 | Young | G06F 21/572 717/168 |

(Continued)

*Primary Examiner* — Henry Tsai
*Assistant Examiner* — Christopher A Daley
(74) *Attorney, Agent, or Firm* — Brooks, Cameron & Huebsch PLLC

(57) ABSTRACT

An example non-transitory machine-readable medium may store instructions, which may be executable by a processing resource. The instructions may be executable by a processing resource to cause a computing device to store a configuration profile update in a data structure associated with an interface communicatively coupled to the processing resource, determine, during runtime of the computing device, that a peripheral device is connected to the computing device, and update a configuration profile of the peripheral device using the configuration profile update stored in the data structure.

12 Claims, 5 Drawing Sheets

(56) References Cited

U.S. PATENT DOCUMENTS

2015/0254093 A1* 9/2015 Ho .................. G06F 9/45558
                                                            718/1
2017/0090948 A1    3/2017  Waidhofer et al.
2017/0242686 A1    8/2017  Vidyadhara

* cited by examiner

CONFIGURATION PROFILE UPDATES

BACKGROUND

Peripheral devices may be connected to a computing device to provide additional functionality to the computing device. Some peripheral devices may be "hot plugged" into the computing device while the computing device is in an operational state.

DETAILED DESCRIPTION

Figure 1A:
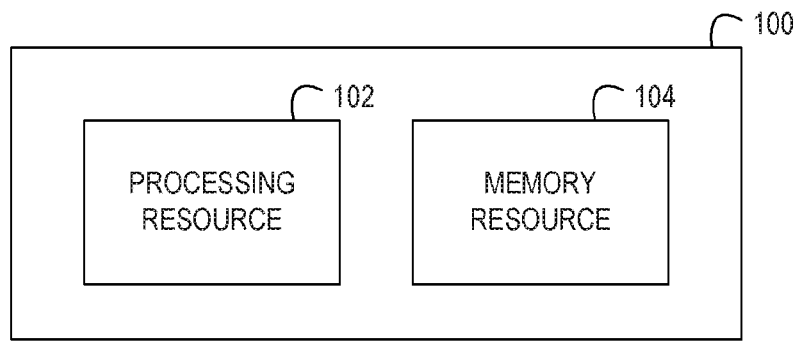
FIG. 1A illustrates an example of an apparatus including a processing resource and a memory resource for configuration profile updates consistent with the disclosure.

A peripheral device may be connected to a computing device to provide additional functionality to the computing device. For example, a peripheral device such as a docking station may be connected to a computing device to provide replicated and/or additional ports, connectors, display adapters, audio chipsets, graphics processing units, storage, and/or memory card readers, among other functionalities to the computing device.

As used herein, a "peripheral device" is an auxiliary electronic device that may be connected to a computing device (e.g., a host computing device). Examples of peripheral devices include docking stations, image scanners, microphones, loudspeakers, webcams, digital cameras, printing devices, touchscreens, etc., which may be connected to a computing device such as a laptop computer, desktop computer, tablet, phablet, convertible laptop, smartphone, server (e.g., blade server), etc.

Peripheral devices may include a configuration profile (e.g., instructions that are executable to control operation of the peripheral device). In some examples, such instructions may be stored in the form of firmware and/or software and executed using hardware, which may be pushed from the computing device to the peripheral device if it is determined that the instructions responsible for operation of the peripheral device are out of date (e.g., that a newer version of the configuration profile than the currently installed configuration profile is available). For example, the computing device may communicate with the peripheral device to determine that a configuration profile (e.g., the instructions responsible for operation) of the peripheral device can be updated. If it is determined that the configuration profile of the peripheral device is to be updated, the computing device can distribute an update (e.g., a device driver package, firmware update packages, etc.) to the peripheral device. As used herein, a "configuration profile" comprises instructions responsible for operation of the peripheral device such as firmware.

In some approaches, the configuration profile of the peripheral device may be updated using the united extensible firmware interface (UEFI) specification. The UEFI specification may provide a software interface between the operating system of the computing system and the configuration profile (e.g., firmware) utilized by the peripheral device. However, the UEFI specification requires that peripheral devices having their configuration profiles updated are present during reboot in order for the configuration profile update (e.g., firmware update) to be applied.

In some approaches, the UEFI specification may store information corresponding to the configuration profile of the peripheral device in an extensible firmware interface (EFI) system resource table (ESRT). The ESRT may comprise, or may be stored in, a data structure. As used herein, a "data structure" is a specialized format for organizing and/or storing data, which may or may not be organized in rows and columns. Examples of data structures include arrays, files, records, tables, trees, etc.

In some approaches, the ESRT may include data corresponding to a peripheral device configuration profile and/or a peripheral device configuration profile update in a non-persistent fashion. For example, the data corresponding to the peripheral device configuration profile (or update thereto) may be exposed by the computing system basic input/output system (BIOS) prior to the computing system booting to its operating system. However, once the computing device is booted to runtime, the configuration profile and/or configuration profile update may not be exposed by the BIOS. Because the data stored in the ESRT may only be exposed prior to the computing booting to its operating system, configuration profile updates applied using the UEFI specification may fail when applied to some peripheral devices.

For example, configuration profile updates applied to removable peripheral devices that may be hot plugged into the computing system (e.g., removable peripheral devices that may be connected to the computing system during runtime of the computing system) may fail if they are applied to the peripheral device using the UEFI specification.

In contrast, examples herein may allow for configuration profile updates to be applied to peripheral devices during runtime. This may allow for configuration profile updates to hot pluggable peripheral devices to be applied without having to reboot the computing device, which may allow for less computing device downtime, less power consumption due to a reduced number of reboot operations to the computing device, and/or a more streamlined end user computing experience as opposed to some previous approaches.

For example, as described herein, an advanced configuration and power interface (ACPI) specification may be utilized to apply configuration updates to peripheral devices connected to a computing device. In some examples, the ACPI may be provided as a separate interface from a REFI and may be used to apply updates to peripheral devices connected to a computing device. As used herein, an "interface" is a shared boundary across which two or more separate components of a computing device exchange information. In some examples, the interface may be a software interface, hardware interface, or combinations thereof.

The ACPI may allow for data corresponding to a peripheral device configuration profile and/or a peripheral device configuration profile update to be stored in a persistent fashion, for example, in an ACPI data structure, which may allow for a configuration profile of a removable peripheral device to be updated during runtime of the computing device and/or in response to a determination that a removable peripheral device has been hot plugged into the computing device.

Examples of the disclosure include apparatuses, machine-readable media, and methods relating to a configuration profile update. In some examples, a non-transitory machine-readable medium may store instructions, which may be executable by a processing resource. The instructions may be executable by the processing resource to cause a computing device to store a configuration profile update in a data structure associated with an interface communicatively coupled to the processing resource, determine, during runtime of the computing device, that a peripheral device is connected to the computing device, and update a configuration profile of the peripheral device using the configuration profile update stored in the data structure.

The figures herein follow a numbering convention in which the first digit corresponds to the drawing figure number and the remaining digits identify an element or component in the drawing. For example, reference numeral 100 may refer to element "00" in FIG. 1 and an analogous element may be identified by reference numeral 200 in FIG. 2. Elements shown in the various figures herein can be added, exchanged, and/or eliminated so as to provide a number of additional examples of the disclosure. In addition, the proportion and the relative scale of the elements provided in the figures are intended to illustrate the examples of the disclosure, and should not be taken in a limiting sense.

FIG. 1A illustrates an example of an apparatus 100 including a processing resource 102 and a memory resource 104 consistent with the disclosure. As shown in FIG. 1A, the apparatus 100 may include a processing resource 102 and a memory resource 104. The apparatus 100 may include hardware and/or firmware (e.g., microcode instructions) in the form of an application specific integrated circuit (ASIC), field programmable gate array, etc. The apparatus 100 may be referred to herein as a "configuration update component."

The apparatus 100 may be a part of a computing device. In some examples, the apparatus 100 may be disposed in a computing device and may be operable to perform certain tasks and/or functions. For example, the apparatus 100 may be operable to store a configuration profile update for a peripheral device, determine that a peripheral device has been connected to the computing device, and/or cause the configuration profile update to be applied to the peripheral device, as described in more detail, herein.

The processing resource 102 may include one or more computer processors (e.g., electronic circuitry operable to execute instructions). For example, the processing resource 102 may be a central processing unit (CPU), semiconductor based microprocessor, integrated circuit based microprocessor, vector processor, and/or other hardware device(s) suitable for retrieval and execution of instructions stored in the memory resource 104.

The memory resource 104 may include volatile and/or non-volatile memory configured to store instructions executable by the processing resource 102. For example, the memory resource 104 may include flash memory, read-only memory (ROM), programmable read-only memory (PROM), erasable programmable read-only memory (EPROM), electrically erasable programmable read-only memory (EEPROM), dynamic random-access memory (DRAM), static random-access memory (SRAM), and/or other suitable storage media.

Figure 2:
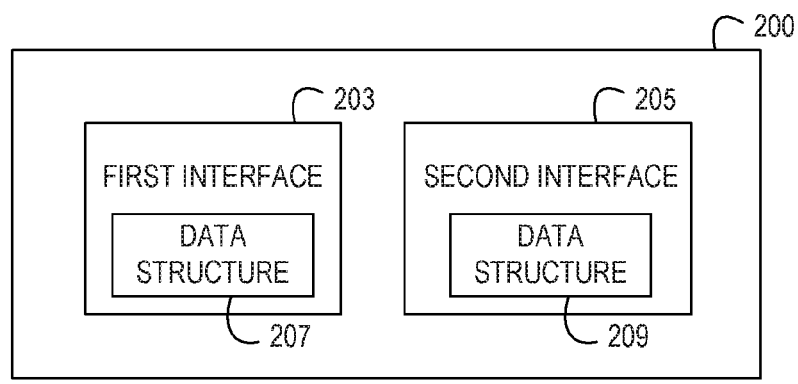
FIG. 2 illustrates an example of an apparatus including a first interface and a second interface for configuration profile updates consistent with the disclosure.
Figure 3:
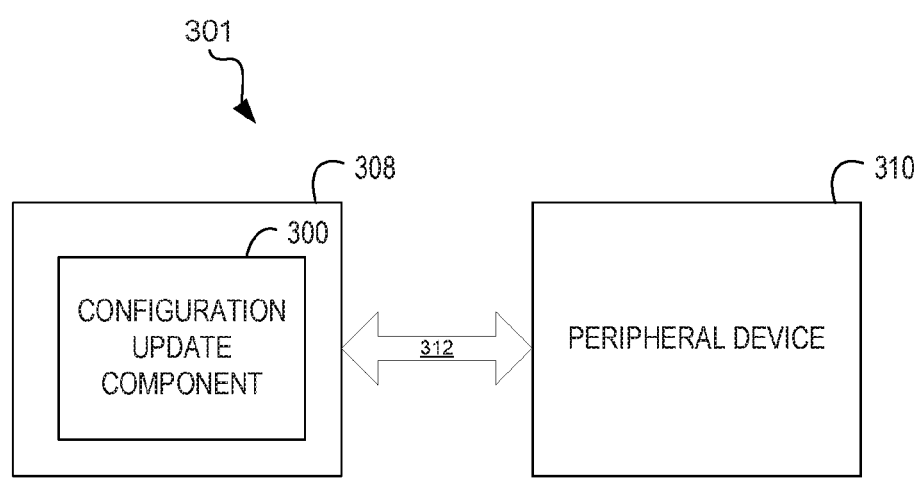
FIG. 3 illustrates an example of a system including a computing device and a peripheral device for configuration profile updates consistent with the disclosure.

In some examples, the processing resource 102 may execute instructions stored in the memory resource 104 to cause a computing device (e.g., computing device 308 illustrated in FIG. 3) to determine that a peripheral device (e.g., peripheral device 310 illustrated in FIG. 3) has been connected to the computing device, and update a configuration profile of the peripheral device using a configuration profile update stored in a data structure, as described in more detail herein in connection with FIGS. 2 and 3.

Figure 1B:
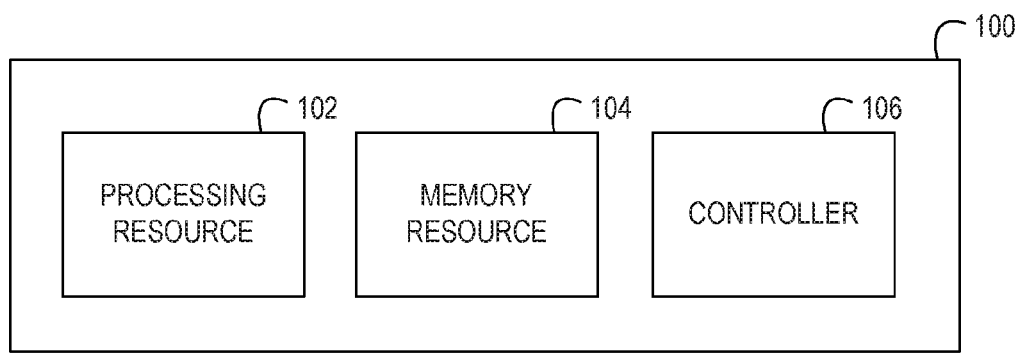
FIG. 1B illustrates an example of an apparatus including a processing resource, a memory resource, and a controller for configuration profile updates consistent with the disclosure.

FIG. 1B illustrates an example of an apparatus 100 including a processing resource 102, a memory resource 104, and a controller 106 consistent with the disclosure. The controller 106 can be configured to control operation of the apparatus 100. In some examples, the controller 106 can decode signals received to, and transmitted from, the apparatus 100 that are used to control operation of the apparatus 100. The controller 106 can be a state machine, sequencer, or some other type of controller, and can include hardware and/or firmware (e.g., microcode instructions) in the form of an application specific integrated circuit (ASIC), field programmable gate array, etc. In some examples, the controller 106 can control generation and decoding of signals transferred between the apparatus 100 and a peripheral device (e.g., peripheral device 310 illustrated in FIG. 3, herein) to cause a configuration profile of the peripheral device to be updated.

FIG. 2 illustrates an example of an apparatus 200 including a first interface 203 and a second interface 205 consistent with the disclosure. As discussed above, the apparatus 200 may be referred to as a configuration update component 200. As shown in FIG. 2, the first interface 203 may include a data structure 207, and the second interface may include a data structure 209. Although data structure 207 and data structure 209 are shown in FIG. 2 as being part of the first interface 203 and the second interface 205, respectively, examples are not so limited and the data structure 207 and/or the data structure 209 may be separate from the first interface 203 and/or second interface 205.

In some examples, the first interface 203 may be an ACPI, and the second interface 205 may be a UEFI. The data structure 207 corresponding to the first interface 203 may include an ACPI table to store configuration updates corresponding to peripheral devices that may be connected to a computing device. The data structure 209 corresponding to the second interface 205 may include an EFI system resource table such as an ESRT to store configuration updates corresponding to the computing device. Although shown as included in the first interface 203 and the second interface 205, data structure 207 and/or data structure 209 may be stored elsewhere, for example, in a memory resource such as memory resource 104 illustrated in FIG. 1.

FIG. 3 illustrates an example of a system 301 including a computing device 308 and a peripheral device 310 consistent with the disclosure. The configuration update component 300 corresponds to apparatus 100 described in FIGS. 1A and 1B, and apparatus 200 described in FIG. 2, herein.

A communication path 312 may couple the computing device 308 to the peripheral device 310 via ports (not explicitly shown). The ports may be universal serial bus (USB) ports such as USB 1.x, USB 2.0, USB 3.0, USB 3.1, USB 3.2, etc., or other ports that allow a communicative connection to be made between the computing device 308 and the peripheral device 310. Examples are not limited to a physical communication path 312; however, and the computing device 308 and the peripheral device 310 may be communicatively connected via a wireless communication protocol such as radio-frequency identification (RFID), BLUETOOTH®, ZigBee, etc.

In some examples, establishing a communicative connection between the computing device 308 and the peripheral device 310 may include a handshaking protocol. As used herein, a "handshaking protocol" is a negotiation process that dynamically sets parameters of a communication channel between two entities before communication over the communication channel begins. For example, the computing device 308 and the peripheral device 310 may negotiate parameters in order to establish rules for communications between each other. In some examples, the computing device 308 can determine that the peripheral device 310 has been connected thereto (e.g., has been hot plugged into the computing device 308) responsive to completion of the handshaking process.

In some examples, the configuration update component 300 may be used to determine that a peripheral device 310 has been connected to the computing device 308. For example, a signal alerting the computing device 308 that the peripheral device 310 has been connected to the computing device 308 may be transferred between the computing device 308 and the peripheral device 310 via communication path 312.

In some examples, the peripheral device 310 may be connected to the computing device 308 during runtime of the computing device 308. For example, the peripheral device 310 may be hot plugged into the computing device 308. In some examples, the peripheral device 310 may be connected to the computing device during runtime of the computing device 308, but may not be connected to the computing device 308 prior to runtime of the computing device 308.

The configuration update component 300 may evaluate a first interface (e.g., first interface 203 illustrated in FIG. 2) and a second interface (e.g., second interface 205 illustrated in FIG. 2) to determine that a configuration update for the peripheral device 310 is stored in a first data structure (e.g., first data structure 207 illustrated in FIG. 2) associated with the first interface or a second data structure (e.g., second data structure 209 illustrated in FIG. 2) associated with the second interface. In some examples, the first interface may be an advanced configuration and power interface, and the second interface may be an extensible firmware interface. As discussed above, the configuration update may include a firmware update for the peripheral device 310.

In some examples, the configuration update component 300 may cause the computing device 308 to store an indication that the configuration profile of the peripheral device 310 has been updated in a data structure associated with at least one of the first interface and the second interface. For example, a flag may be appended to the first data structure (e.g., data structure 207 illustrated in FIG. 2) to indicate that the configuration profile of the peripheral device 310 has been updated with the updated configuration profile.

In some examples, the configuration update component 300 may update the peripheral device using the configuration update stored in the first interface during runtime of the computing device 308. For example, the configuration profile of the peripheral device 310 may be updated without rebooting the computing device to expose an ESRT by the BIOS.

The configuration update component 300 may, in some examples, cause the computing device 308 to display, via a graphical user interface (GUI), a message indicating that the configuration profile of the peripheral device 310 is being updated while the configuration profile of the peripheral device 310 is being updated. For example, the configuration update component 300 may cause the computing device 308 to display a GUI including one or more messages informing a user that the configuration profile of the peripheral device 310 is being updated and/or that the user should avoid disconnecting the peripheral device 310 from the computing device 308 while the configuration profile of the peripheral device 310 is being updated.

Figure 4A:
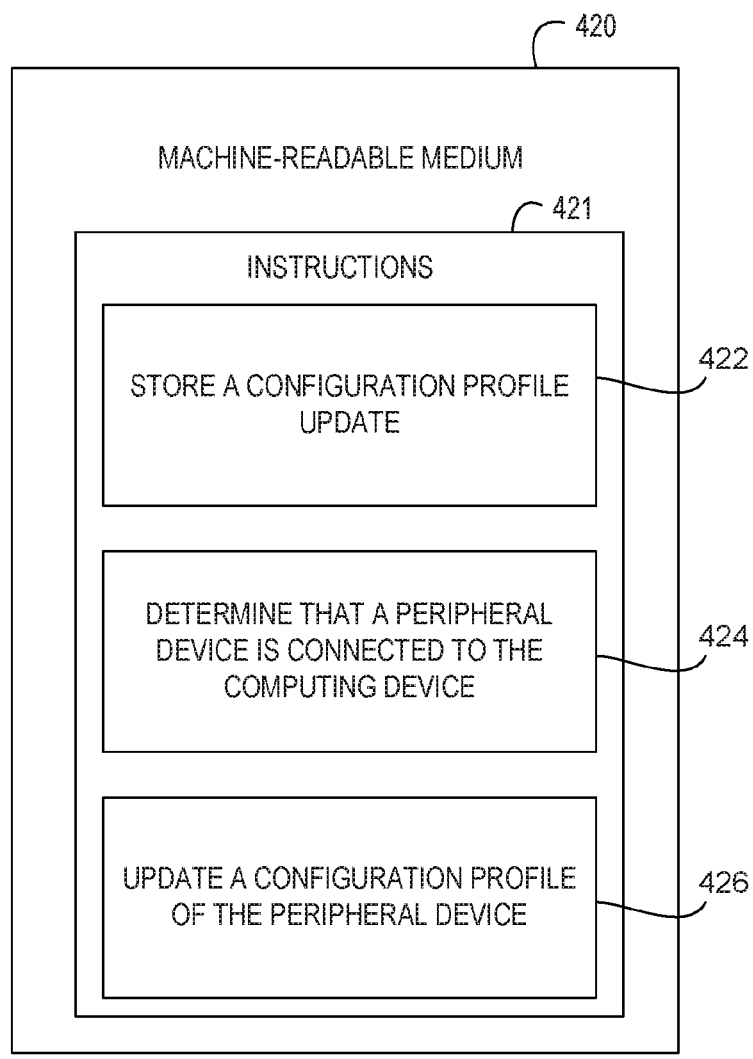
FIG. 4A illustrates an example of a machine-readable medium having instructions stored thereon for configuration profile updates consistent with the disclosure.

FIG. 4A illustrates an example of a machine-readable medium 420 having instructions 421 stored thereon consistent with the disclosure. In some examples, the instructions 421 stored on the machine-readable medium 420 may be executable by a processing resource (e.g., processing resource 102 illustrated in FIGS. 1A and 1B).

In some examples, the machine-readable medium 420 may include instructions 422 which may be executable by a processing resource to cause a computing device (e.g., computing device 308 illustrated in FIG. 3) to store a configuration profile update in a data structure (e.g., data structure 207/data structure 209 illustrated in FIG. 2, herein) associated with an interface communicatively coupled to the processing resource.

The machine-readable medium 420 may include instructions 424 which may be executable by a processing resource to cause a computing device to determine, during runtime of the computing device, that a peripheral device is connected to the computing device. For example, the instructions 421 may be executable to determine that the peripheral device was connected to the computing device during runtime of the computing device. As an example, the instructions 421 may be executable to determine that the peripheral device was hot plugged into the computing device during runtime of the computing device.

In some examples, the machine-readable medium 420 may include instructions 426 which may be executable by a processing resource to cause a computing device to update a configuration profile of the peripheral device using the configuration profile update stored in the data structure. In some examples, the instructions 421 may be further executable to update the configuration profile of the peripheral device during runtime of the computing device.

The machine-readable medium 420 may include instructions 421 which may be executable by a processing resource to cause a computing device to display a message via a graphical user interface indicating that the configuration profile of the peripheral device is being updated. In some examples, the machine-readable medium 420 may include instructions 421 which may be executable by a processing resource to cause a computing device to display a message via a graphical user interface indicating that the configuration profile of the peripheral device is not to be disconnected from the computing device. In some examples, these messages may alert an end user that the peripheral device should remain connected to the computing device to avoid a failure of the updated configuration profile.

Figure 4B:
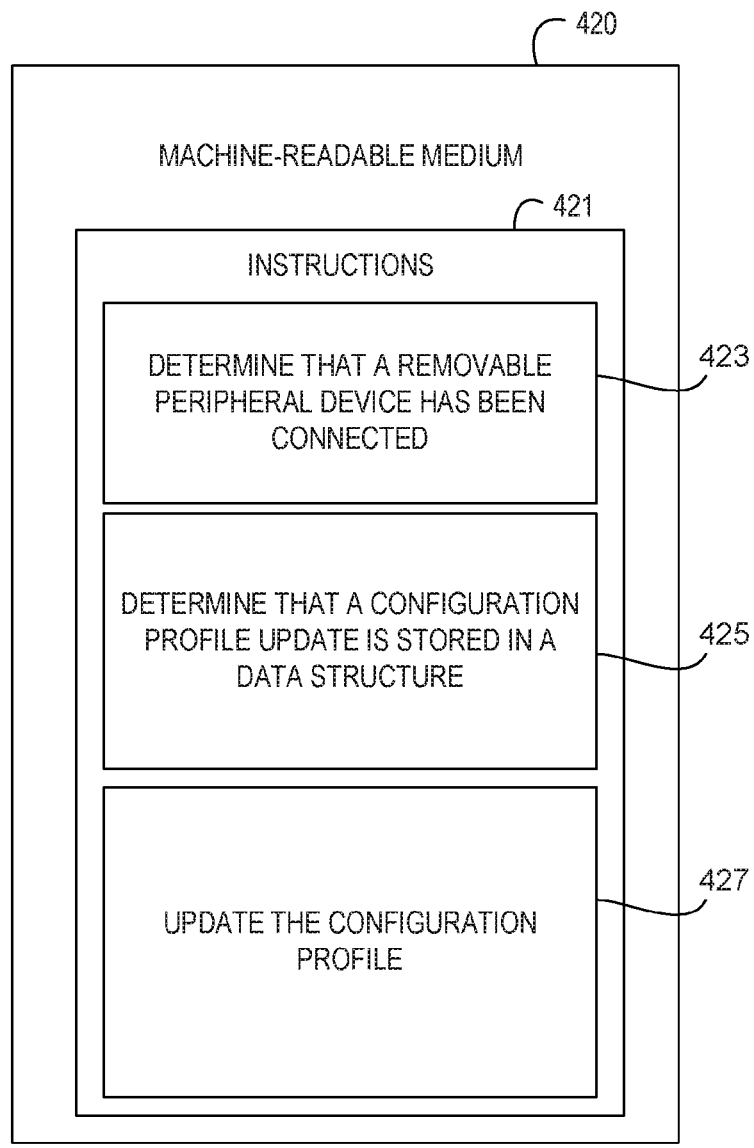
FIG. 4B illustrates another example of a machine-readable medium having instructions stored thereon for configuration profile updates consistent with the disclosure.

FIG. 4B illustrates another example of a machine-readable medium 420 having instructions 421 stored thereon consistent with the disclosure. In some examples, the instructions 421 stored on the machine-readable medium 420 may be executable by a processing resource (e.g., processing resource 102 illustrated in FIGS. 1A and 1B).

In some examples, the machine-readable medium 420 may include instructions 423 which may be executable by a processing resource to cause a computing device (e.g., computing device 308 illustrated in FIG. 3) to determine that a removable peripheral device has been connected to a computing device. In some examples, determining that the removable peripheral device has been connected to the computing device may include determining that the removable peripheral device has been the computing device during runtime of the computing device.

The machine-readable medium 420 may include instructions 425 which may be executable by a processing resource to cause a computing device to determine that a configuration profile update for the removable peripheral device is stored in a data structure associated with an interface of the computing device. In some examples, the interface may be an ACPI, as described above.

The machine-readable medium 420 may include instructions 427 which may be executable by a processing resource to cause a computing device to update the configuration profile of the removable peripheral device using the configuration profile update stored in the data structure associated with the interface of the computing device during runtime of the computing device. In some examples, the instructions 421 may include instructions to determine, prior to determining that the configuration profile update for the removable peripheral device is stored in the data structure associated with the interface of the computing device, that a capsule firmware update cannot be applied to the removable peripheral device during runtime of the computing device. For example, the instructions 421 may include instructions executable determine that a UEFI is unable to push a capsule firmware update to the peripheral device because the computing device is operating at runtime.

In some examples, the instructions 421 may further include instructions executable to display, via a graphical user interface, a warning message indicating that the removable peripheral device is not to be disconnected form the computing device when the configuration profile of the removable peripheral device is being updated.

Figure 5:
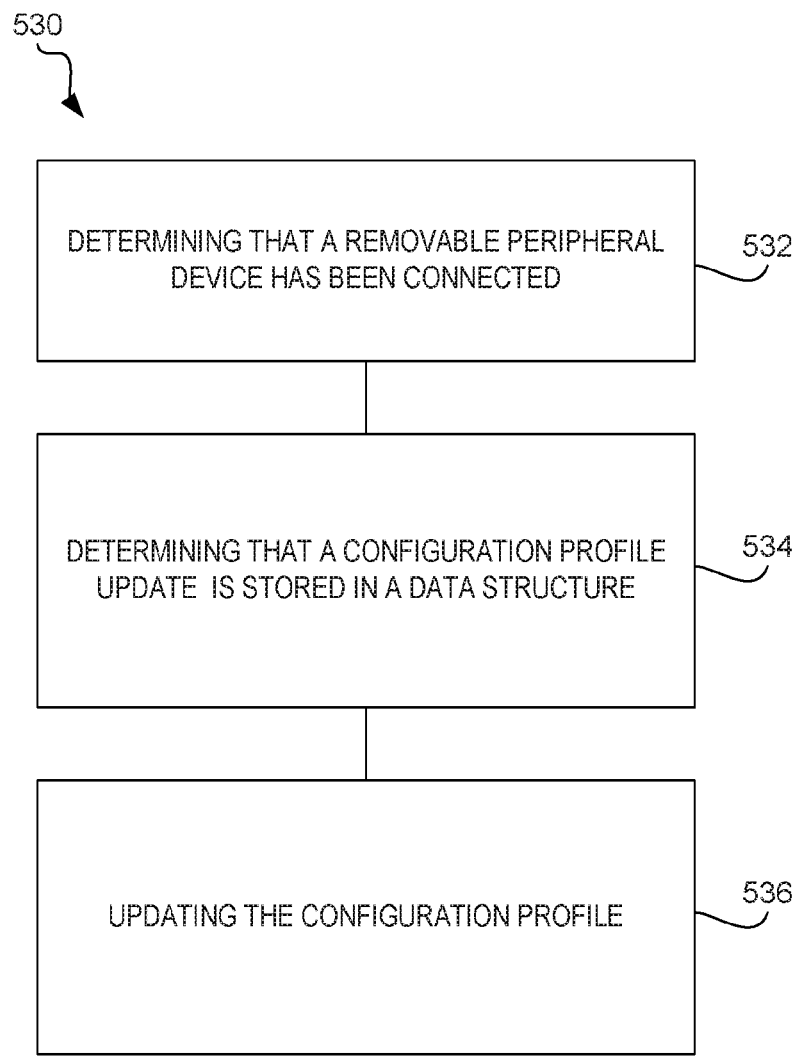
FIG. 5 illustrates an example flow diagram of a method for configuration profile updates consistent with the disclosure.

FIG. 5 illustrates an example flow diagram of a method 530 for a configuration profile update consistent with the disclosure. At block 532, the method 530 may include determining that a removable peripheral device has been connected to a computing device. In some examples, determining that the removable peripheral device has been connected to the computing device may include determining that the removable peripheral device has been the computing device during runtime of the computing device.

At block 534, the method 530 may include determining that a configuration profile update for the removable peripheral device is stored in a data structure associated with an interface of a computing device. In some examples, the interface may be an ACPI, as described above.

At block 536, the method 530 may include updating the configuration profile of the removable peripheral device using the configuration profile update stored in the data structure associated with the interface of the computing device during runtime of the computing device. In some examples, the method 530 may include determining, prior to determining that the configuration profile update for the removable peripheral device is stored in the data structure associated with the interface of the computing device, that a capsule firmware update cannot be applied to the removable peripheral device during runtime of the computing device. For example, the method 530 may include determining that a REFI is unable to push a capsule firmware update to the peripheral device because the computing device is operating at runtime.

In some examples, the method 530 may further include displaying, via a graphical user interface, a warning message indicating that the removable peripheral device is not to be disconnected form the computing device when the configuration profile of the removable peripheral device is being updated.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. As used herein, designators such as "N", etc., particularly with respect to reference numerals in the drawings, indicate that a number of the particular feature so designated can be included, A "plurality of" is intended to refer to more than one of such things.

What is claimed:

1. A non-transitory machine-readable medium storing instructions executable by a processing resource to cause a computing device to:
   store a configuration profile update in a data structure associated with an interface communicatively coupled to the processing resource, wherein the configuration profile update includes instructions for operation of a peripheral device;
   determine, after the computing device has booted to runtime, that the peripheral device is hot plugged into the computing device; and
   update, during runtime when the peripheral device is hot plugged into the computing device, a configuration profile of the peripheral device using the configuration profile update stored in the data structure.

2. The non-transitory machine-readable medium of claim 1, wherein the instructions are further executable to display a message via a graphical user interface indicating that the configuration profile of the peripheral device is being updated.

3. The non-transitory machine-readable medium of claim 1, wherein the instructions are further executable to display a message via a graphical user interface indicating that the configuration profile of the peripheral device is not to be disconnected from the computing device.

4. An apparatus, comprising:
   a processing resource coupled to a memory resource, the processing resource to cause a computing device to:
      determine that a peripheral device has been hot plugged into the computing device after the computing device has booted to runtime;
      evaluate a first interface and a second interface to determine that a configuration profile update for the peripheral device is stored in a data structure coupled to the first interface and the second interface, wherein the configuration profile update includes instructions for operation of the peripheral device; and
      update the peripheral device using the configuration profile update stored in the first interface during runtime of the computing device when the peripheral device is hot plugged into the computing device.

5. The apparatus of claim 4, wherein the first interface is an advanced configuration and power interface, and wherein the second interface is an extensible firmware interface.

6. The apparatus of claim 4, wherein the processing resource is to cause the computing device to store an indication that the configuration profile of the peripheral device has been updated in the data structure.

7. The apparatus of claim 4, wherein the processing resource is to cause the computing device to display, via a graphical user interface, a message indicating that the configuration profile of the peripheral device is being updated while the configuration profile of the peripheral device is being updated.

8. A non-transitory machine-readable medium storing instructions executable by a processing resource to cause a computing device to:
   determine that a removable peripheral device has been hot plugged into a computing device after the computing device has booted to runtime;
   determine that a configuration profile update for the removable peripheral device is stored in a data structure associated with an interface of the computing device, wherein the configuration profile update includes instructions for operation of the removable peripheral device; and
   update the configuration profile of the removable peripheral device using the configuration profile update stored in the data structure associated with the interface of the computing device during runtime of the computing device when the removable peripheral device is hot plugged into the computing device.

9. The non-transitory machine-readable medium of claim 8, wherein the interface is an advanced configuration and power interface.

10. The non-transitory machine-readable medium of claim 8, wherein the instructions are further executable to determine that the removable peripheral device has been removed from the computing device during runtime of the computing device.

11. The non-transitory machine-readable medium of claim 8, wherein the instructions are further executable to determine prior to determining that the configuration profile update for the removable peripheral device is stored in the data structure associated with the interface of the computing device, that a capsule firmware update cannot be applied to the removable peripheral device during runtime of the computing device.

12. The non-transitory machine-readable medium of claim 8, wherein the instructions are further executable to display, via a graphical user interface, a warning message indicating that the removable peripheral device is not to be disconnected form the computing device when the configuration profile of the removable peripheral device is being updated.

* * * * *